United States Patent [19]
Birner et al.

[11] 3,716,136
[45] Feb. 13, 1973

[54] INSPECTING ARTICLES

[75] Inventors: Richard A. Birner, Toledo; Robert D. Kohler, Temperance, Mich.; Stewart M. Lang, Toledo, both of Ohio

[73] Assignee: Owens-Illinois, Inc., Toledo, Ohio

[22] Filed: May 28, 1971

[21] Appl. No.: 147,838

[52] U.S. Cl. ............... 209/82, 209/111.7, 250/223 B
[51] Int. Cl. ............................................. B07c 5/342
[58] Field of Search ................. 209/111.7, 111.6, 80; 250/223 B, 227; 356/240

[56] References Cited

UNITED STATES PATENTS

| | | | |
|---|---|---|---|
| 3,529,169 | 9/1970 | Heaney et al. | 250/223 B |
| 3,365,699 | 1/1968 | Foster | 250/223 B |
| 3,549,890 | 12/1970 | Keller | 250/223 B |
| 3,395,794 | 8/1968 | Petry | 209/82 |
| 3,603,457 | 9/1971 | Flodin | 209/82 |

*Primary Examiner*—Allen N. Knowles
*Attorney*—J. R. Nelson and E. J. Holler

[57] ABSTRACT

A method and apparatus for inspecting articles to determine whether or not peripheral portions of the articles are in predetermined relation to one another which comprises moving the articles in a continuous path past an inspection station, directing a first beam of light transversely of the path of the article, causing a first portion of each article to intercept said first beam of radiant energy, directing a second beam of radiant energy which is in predetermined relation to the first beam and is adapted to have one part thereof intercepted by a second portion of the article and another part thereof pass the article if the second portion of the article is in predetermined relation to the first portion and creating a signal for reject or recording when the second beam is intercepted in its entirety or passes without intercepting the article. The method and apparatus further comprises utilizing a plurality of beams at different preselected longitudinally spaced areas of the article to determine other positions of various portions on the periphery of the article with respect to one another at each cross-section.

11 Claims, 13 Drawing Figures

INSPECTING ARTICLES

This invention relates to inspecting articles and particularly to the inspection of hollow containers such as glass containers to determine whether specific regions of the shape and height thereof are within predetermined limits.

In the filling, use, handling, and strength of hollow containers such as glass containers as well as from the standpoint of the aesthetic commercial value, it is essential that the shape of the container be maintained, that is, that the shape of the containers be substantially the same. This problem is also of interest in apparatus for making containers such as a glass ribbon machine wherein it is desirable to ascertain any major deviations early in the manufacture of the article so that the article can be discarded and subsequent operations in the manufacture of the article will not be wasted as well as to prevent any deviation of the article from a predetermined standard from adversely affecting the apparatus which performs subsequent functions to make the completed article.

Accordingly, among the objects of the invention are to provide a method and apparatus for inspecting articles and particularly glass articles to determine the relative relationships of various portions on the periphery thereof with respect to one another; which is particularly applicable to inspection of hot glass articles made by glass forming processes, example, by the hot ribbon process, to inspect the articles prior to final forming; such a method and apparatus which is operable even at high speeds on the order of 1,000 articles per minute or more; which are operable upon articles which are moved continuously without interruption; which are operable on articles without the need for rotation of the article; which are operable to inspect the articles without contact therewith; which are operable to inspect the articles in longitudinally spaced relation but without limitation on the spacing of the articles longitudinally of one another; which are operable to inspect the articles without regard to the tilt thereof with respect to an axis therethrough; which are operable to inspect various portions of the articles independently of other portions; which incorporate relatively reliable and efficient electronic circuitry; and which circuitry is operated to produce a reject signal or indicate the condition of the article.

SUMMARY OF THE INVENTION

A method and apparatus for inspecting articles to determine whether or not peripheral portions of the articles are in predetermined relation to one another which comprises moving the articles in a continuous path past an inspection station, directing a first beam of light transversely of the path of the article, causing a first portion of each article to intercept said first beam of radiant energy, directing a second beam of radiant energy which is in predetermined relation to the first beam and is adapted to have one part thereof intercepted by a second portion of the article and another part thereof pass the article if the second portion of the article is in predetermined relation to the first part and creating a signal for rejection or recording when the second beam is intercepted in its entirety or passes without intercepting the article. The method and apparatus further comprises utilizing a plurality of beams at preselected different longitudinally spaced areas of the article to determine other positions of various portions on the periphery of the article with respect to one another at each cross-section.

DESCRIPTION

Figure 1:
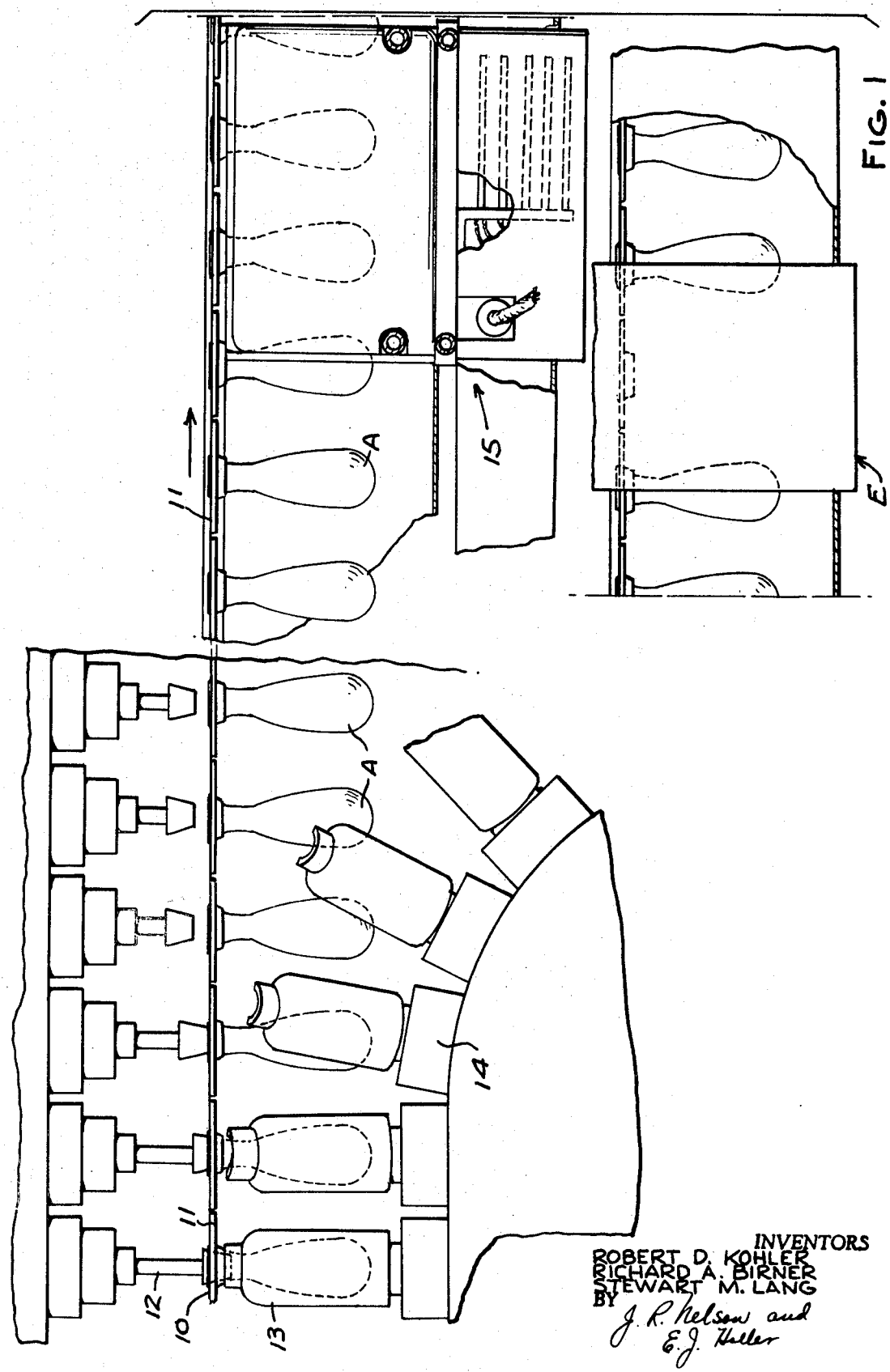
FIG. 1 is a fragmentary side elevational view of an exemplary glass article forming system embodying the invention.

Referring to FIG. 1, the invention is shown in connection with hollow glass articles which are to be formed into hollow containers of the type shown in the U.S. Pat. to Heaton No. 3,372,826, issued Mar. 12, 1968. Although the invention has particular utility in connection with the inspection of hot hollow glass containers which are transparent, the invention is also applicable to articles of other materials and shapes. The containers are generally bulbous and include a body and a narrow neck portion, each of which has all portions thereof substantially annular in cross section. Referring specifically to the drawing, the containers are made on what is conventionally known as a hot ribbon machine from a ribbon 10 of glass which is carried along by interconnected orifice plates 11. The glass is blown outwardly by blowheads 12 against the sides of sectional molds 13 carried by a chain 14 to form hollow articles A that are connected to the orifice plates 11 as shown.

It is desirable to inspect the articles A for major defects in their peripheral shape and reject the articles which exceed predetermined standards in order to prevent useless subsequent operations and further to prevent damage to other machinery which acts on the article. Accordingly, the inspecting apparatus 15 is positioned along the path of travel of the orifice plates 11 and is adapted to inspect the hot partially formed articles A as they are moved continuously past the inspection station.

Figure 3:
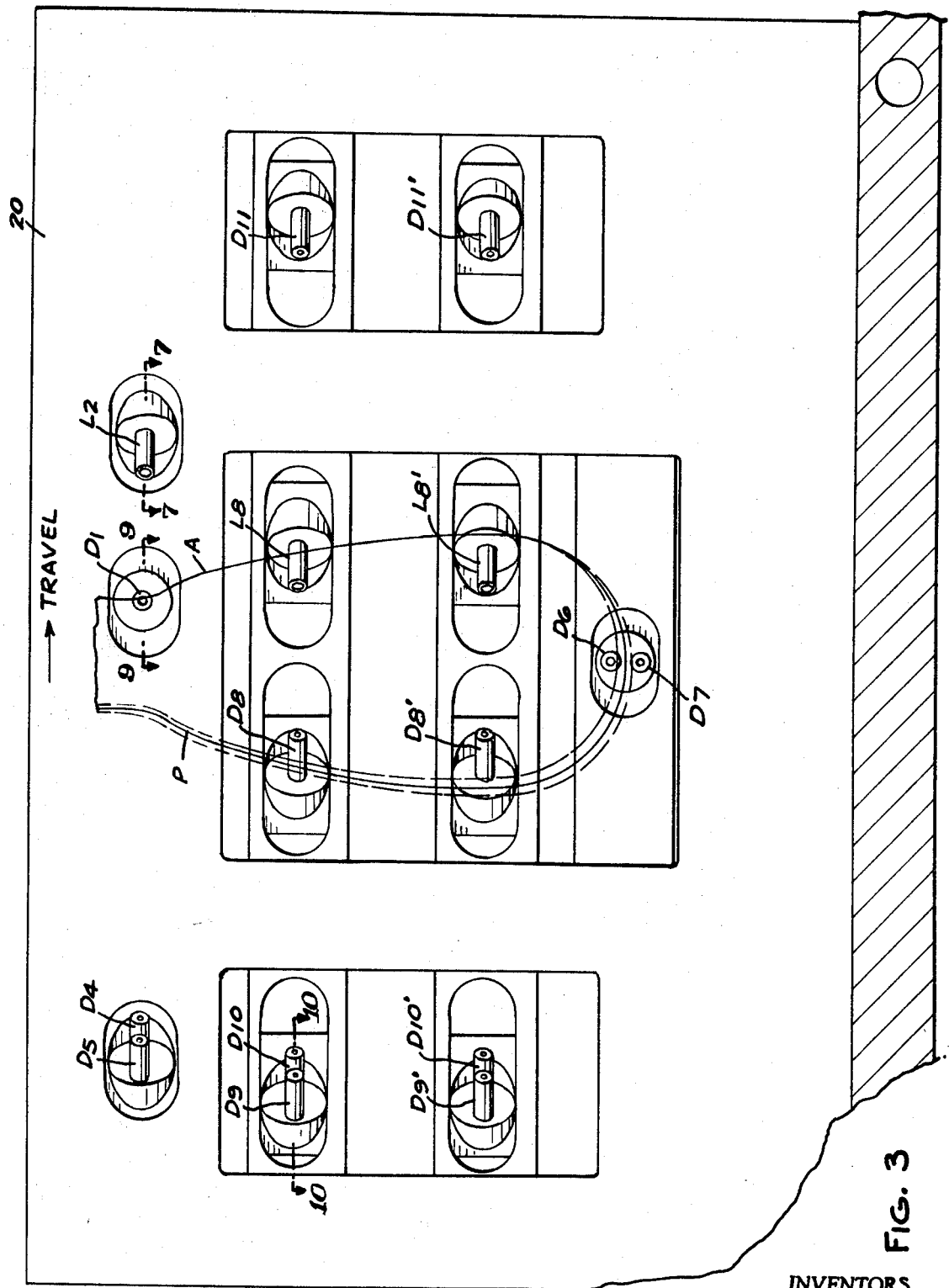
FIG. 3 is a fragmentary sectional view taken along the line 3—3 in FIG. 2.
Figure 4:
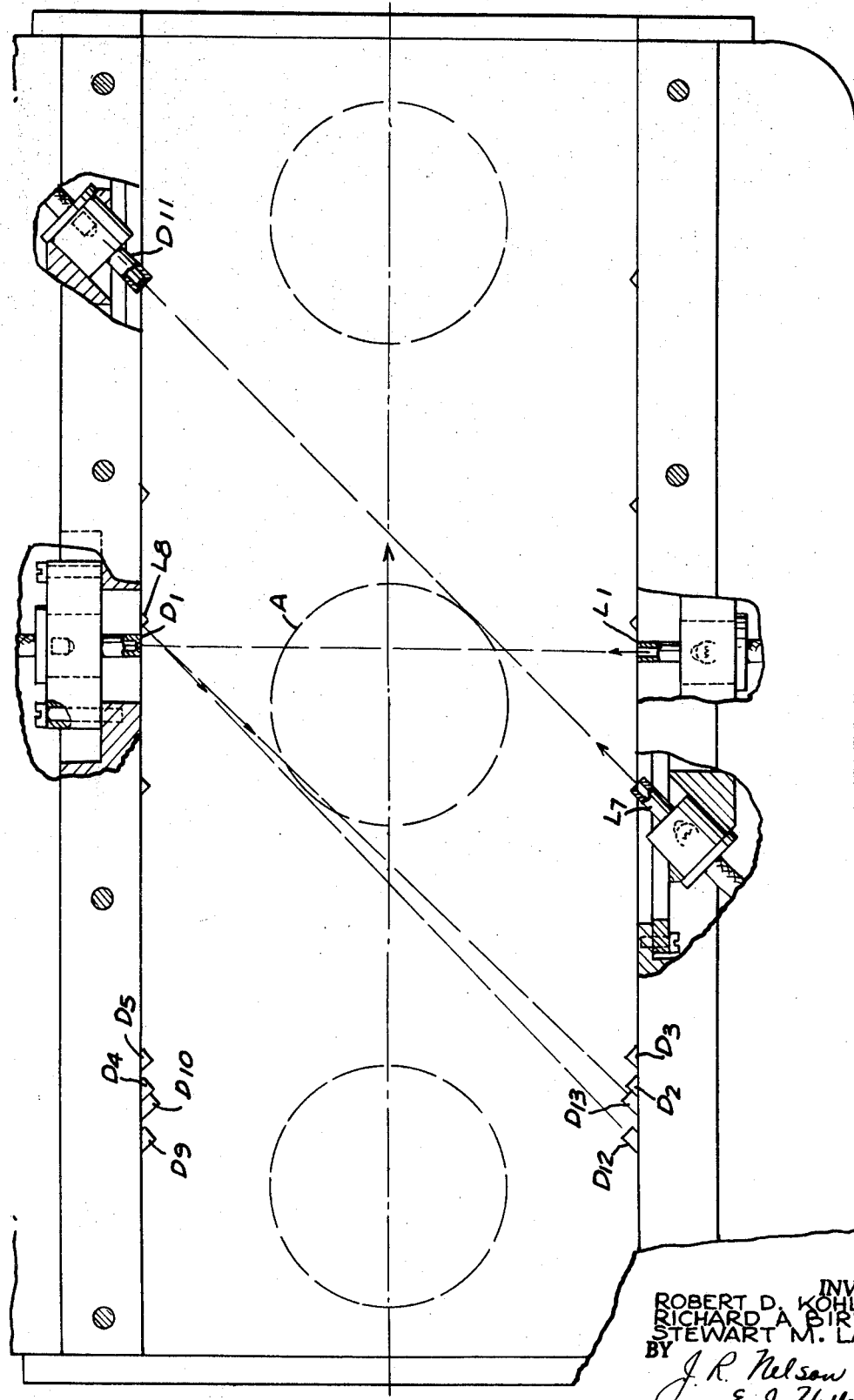
FIG. 4 is a fragmentary part sectional plan view taken along line 4—4 on FIG. 2 of a portion of the system shown in FIG. 2.

Basically, the apparatus is adapted to inspect the articles and determine when one portion or point of the article in a transverse horizontal plane is not in predetermined relationship to another portion or point in that or another plane. For example, as shown in FIG. 3, the article A is adapted to be inspected at a certain position in its travel to determine whether the profile P shown in solid lines is within the predetermined limits shown in broken lines at a particular point circumferentially thereof.

Figure 5:
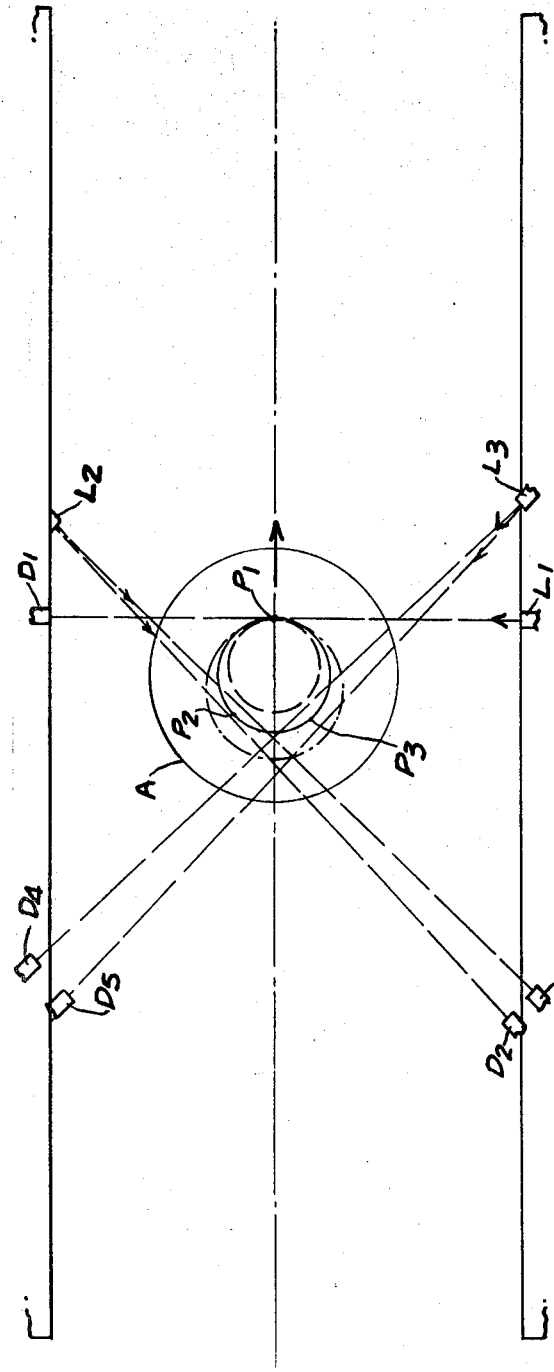
FIGS. 5 and 6 are diagrammatic plan views of the inspection system.
Figure 6:
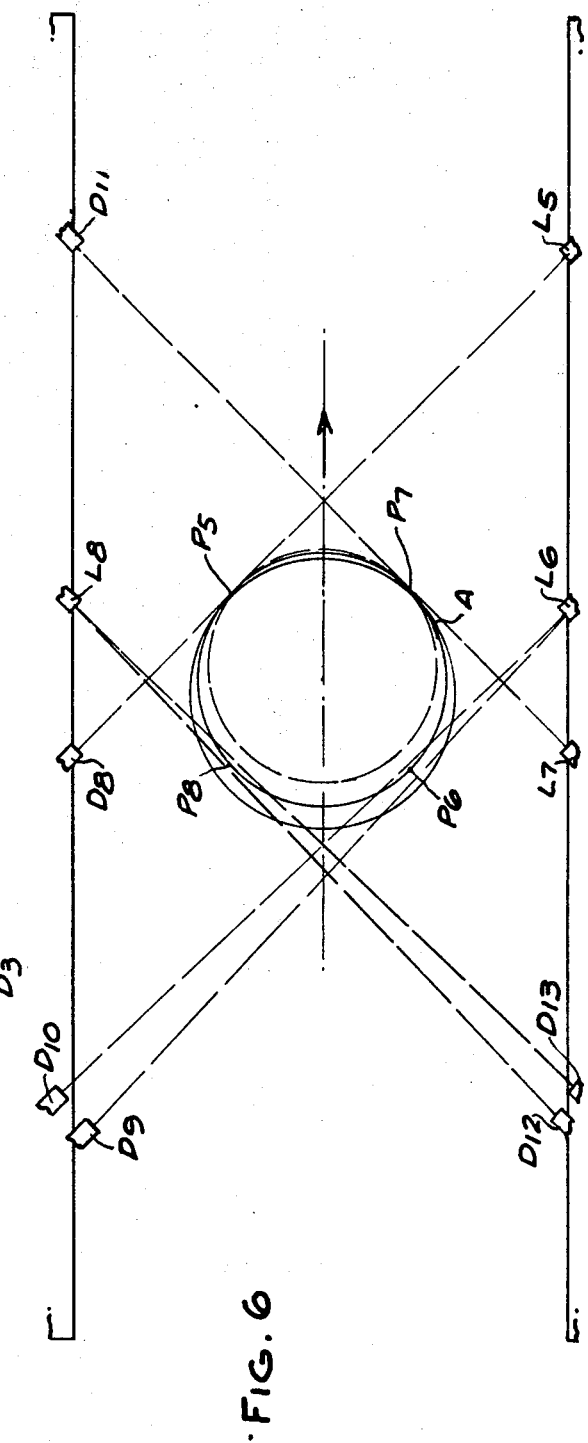

The invention can be more readily understood by references to the diagrams shown in FIGS. 5 and 6. Referring to FIG. 5, a beam of light is directed from a source $L_1$ transversely of the path of movement toward a photosensitive device or detector $D_1$ in a position to be intercepted by the area of small cross section or neck of the article as it approaches the inspection station. In this position of the container, a divergent beam of light from a second light source $L_2$ is directed at an angle to the beam from the light source $L_1$ transversely of the path of the container in a position such that a portion of the beam from light source $L_2$ is intercepted by the part $P_2$ of the container while another portion of the light beam will not be. Photoelectric detectors $D_2$, $D_5$ are positioned so that in the absence of the container the divergent light beam from the source $L_2$ energizes the detectors $D_2$, $D_5$. If at the instant the light beam $L_1$ is intercepted by the container, detector $D_2$ remains energized and detector $D_5$ is de-energized, the part $P_2$ of the article is in predetermined relationship to the part $P_1$. If, however, the part $P_2$ intercepts the light beam from the light source $L_2$ in its entirety so that both detectors $D_2$ and $D_5$ are de-energized, then the part $P_2$ is beyond the predetermined limit with respect to the part $P_1$ of the article and a reject signal is formed as presently described and the article is rejected at a subsequent position along its path by energization of an ejector. If both detectors $D_2$ and $D_5$ remain energized, the article is undersized and a reject signal is produced.

In a similar manner, a third light source $L_3$ is provided in the same plane as the sources $L_1$ and $L_2$ and directs a divergent beam of light at an angle to the light sources $L_1$ and $L_2$ in a position against a part $P_3$ of the container which is in predetermined relationship to the part $P_1$. If the part $P_3$ is in proper relationship, then the detectors $D_4$, $D_3$ will be energized selectively in the manner of detectors $D_2$ and $D_5$. If both detectors $D_4$, $D_3$ are energized or both detectors $D_4$, $D_3$ are de-energized at the time when part $P_1$ intercepts the light beam $L_1$, a reject signal is created.

Figure 2:
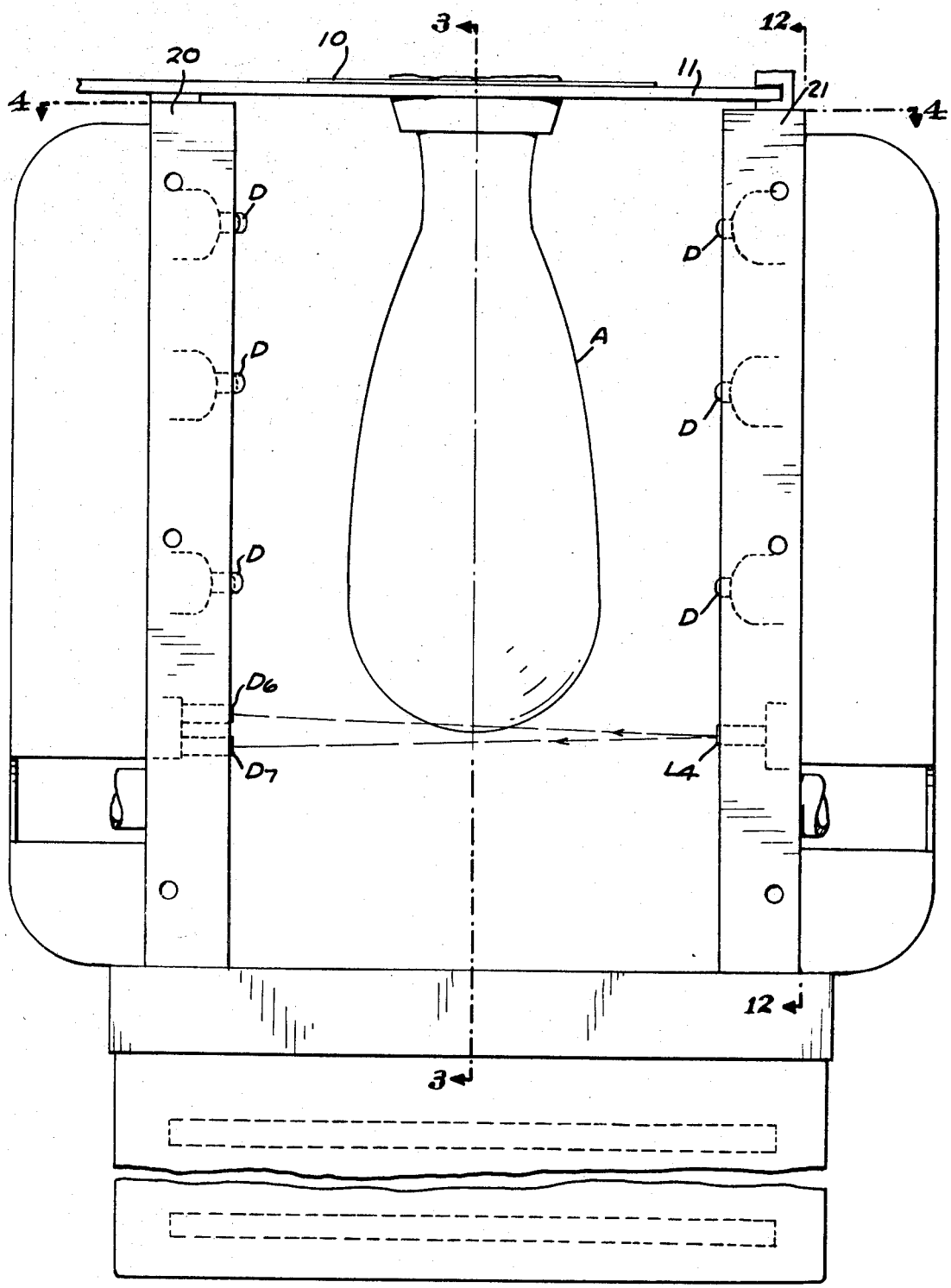
FIG. 2 is an end view on an enlarged scale of a portion of the system shown in FIG. 1.

Referring to FIG. 2, a fourth light source $L_4$ directs a beam transversely at a right angle to the path of movement in a plane spaced downwardly from the plane of beams $L_1$, $L_2$ and $L_3$ to normally direct a divergent beam against detectors $D_6$, $D_7$ and thereby inspect the overall length of the article. At the instant that the detector $D_1$ is de-energized by the movement of the article to the inspecting position, if the detector $D_6$ is de-energized by interruption of the beam by the bottom of the article and the detector $D_7$ remains energized, then the length of the article is within the predetermined required limits. If, however, both the detectors $D_6$, $D_7$ are de-energized, indicating excessive length, or both the detectors $D_6$, $D_7$ remain energized, indicating that the article is shorter than the required length, a reject signal is created.

Referring to FIG. 6, the apparatus is adapted to selectively inspect the position of other transverse horizontal portions of the article at other points longitudinally along the length thereof independently of one another by an arrangement of light beams and detectors as shown in FIG. 6. A light source $L_5$ is directed in a horizontal plane at an acute angle to the direction of travel of the article and normally energizes a detector $D_8$. When the article intercepts the beam from the light source $L_5$, the article if of proper dimension is in position to intercept a portion of the light beam from a light source $L_6$ which directs a divergent beam against detectors $D_9$, $D_{10}$. If the portion $P_6$ is not in predetermined relationship to portion $P_5$, then both of the detectors $D_9$, $D_{10}$ will remain energized or both will remain de-energized indicating a reject signal should be created to reject the articles.

To check another point on the circumference of the article in the same plane, a further light source $L_7$ is provided to direct light against a detector $D_{11}$ and there is associated therewith a light source $L_8$ which directs a divergent beam against detectors $D_{12}$, $D_{13}$. The beams from the light sources $L_7$, $L_8$ function in the same manner to check the relative relationship between portions $P_7$, $P_8$ of the article.

Similarly, associated detectors are provided in the apparatus to inspect another transverse plane longitudinally of the axis of the article in a manner identical to FIG. 6. For purposes of clarity, similar parts are designated with prime numerals in FIGS. 2 and 3.

Referring to FIG. 2, the light sources and photosensitive detectors are mounted on vertical plates 20, 21 that extend along the sides of the path of the articles A. The light sources L and detectors D are adjustably mounted in the plates and provision is made for cooling them in order to maintain stability thereof electronically.

For example, as shown in FIG. 3, the light sources and detectors are mounted in openings in the wall 20. In a similar fashion, the light sources and detectors are mounted on the opposite wall 21.

Figure 7:
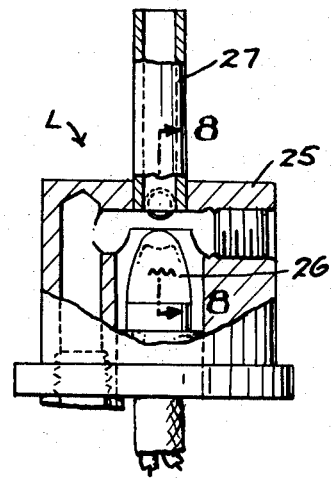
FIG. 7 is a fragmentary sectional view on an enlarged scale taken along the line 7—7 in FIG. 3.
Figure 8:
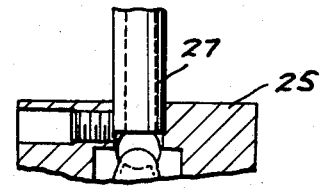
FIG. 8 is a fragmentary sectional view taken along the line 8—8 in FIG. 7.

Referring to FIGS. 7 and 8, a typical light source comprises a body 25 in which a lamp 26 is positioned. A tube 27 is adapted to restrict the beam from the lamp and direct it in a diverging manner toward the oppositely disposed photosensitive detectors. Provision is made for cooling and air purging the body 25 and tube 27.

Figure 9:
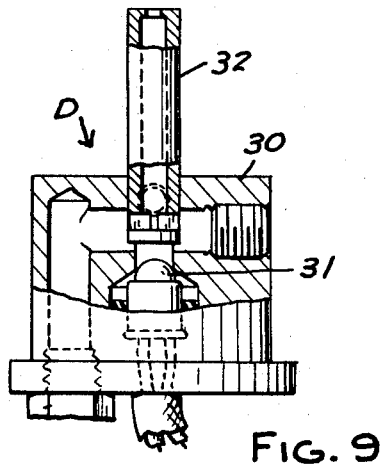
FIG. 9 is a fragmentary sectional view on an enlarged scale taken along the line 9—9 in FIG. 3.
Figure 10:
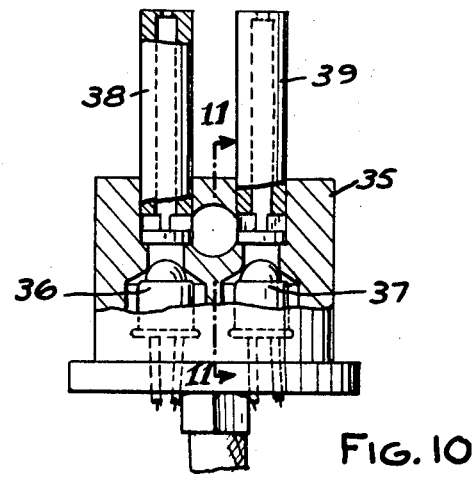
FIG. 10 is a fragmentary sectional view on an enlarged scale taken along the line 10—10 in FIG. 3.
Figure 11:
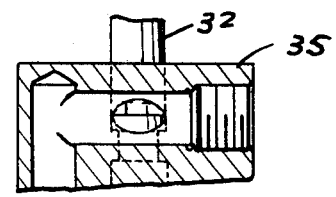
FIG. 11 is a fragmentary sectional view taken along the line 11—11 in FIG. 10.

Similarly, as shown in FIG. 9, each single photoelectric detector comprises a body 30 in which the detector element 31 is positioned with an associated tube 32 restricting the line of vision of the detector and provision being made for air purging. Where a double detector is provided it may be as shown in FIGS. 10 and 11 and comprises a body 35 which has provision to two detectors 36, 37 and associated tubes 38, 39 for limiting the vision of the same. Air purging is provided again through appropriate openings.

Figure 12:
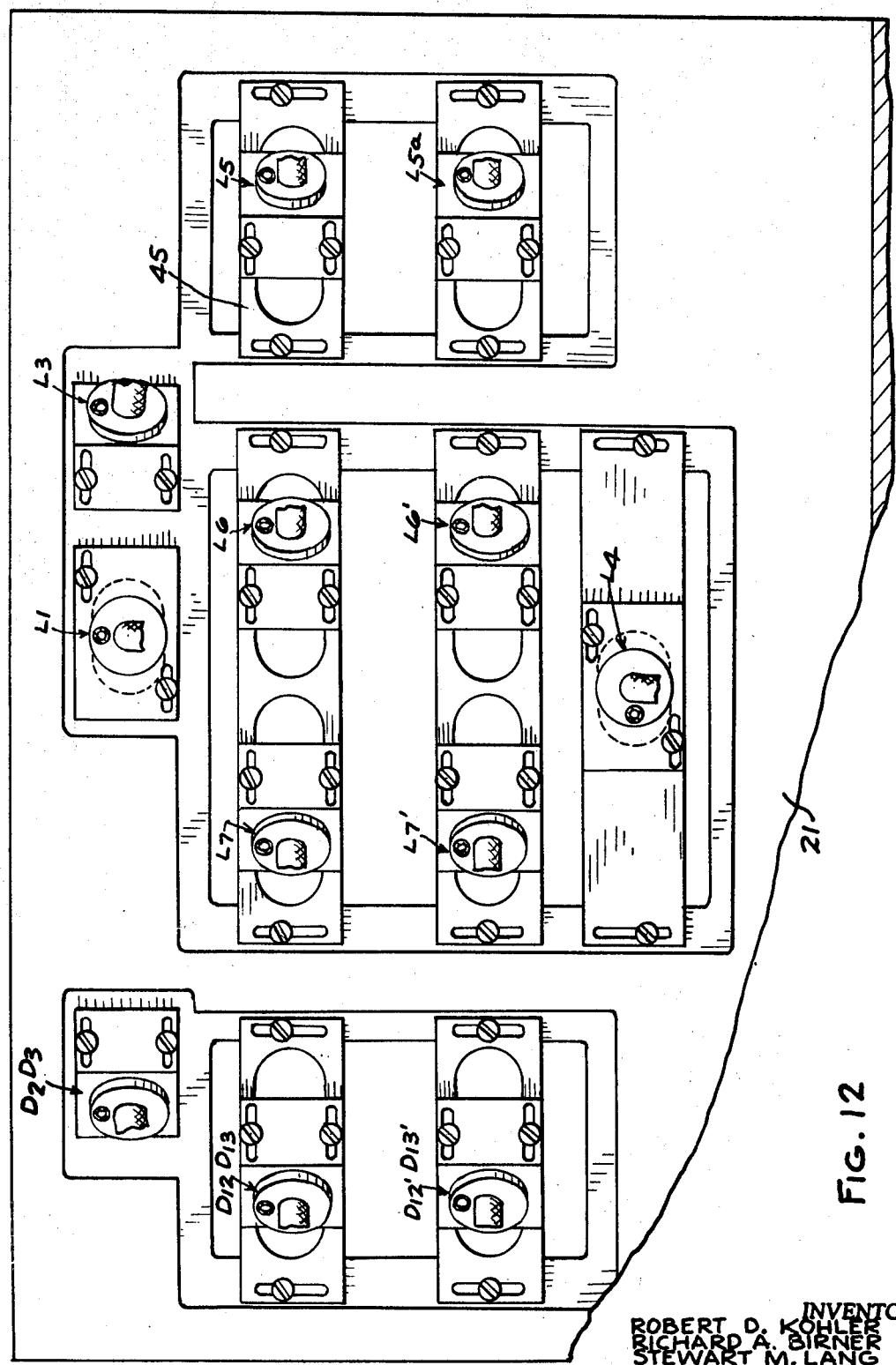
FIG. 12 is a fragmentary elevational view taken along line 12—12 in FIG. 2 of the opposite side of the system shown in FIG. 2.

Each of the bodies of the light sources and detectors is adjustably mounted on plates 45 that are adjustably mounted on the back of the walls 20, 21 as shown in FIG. 12. The bodies are movable on the plates and the plates are in turn adjustable about an axis at 90° thereto on the walls.

Figure 13:
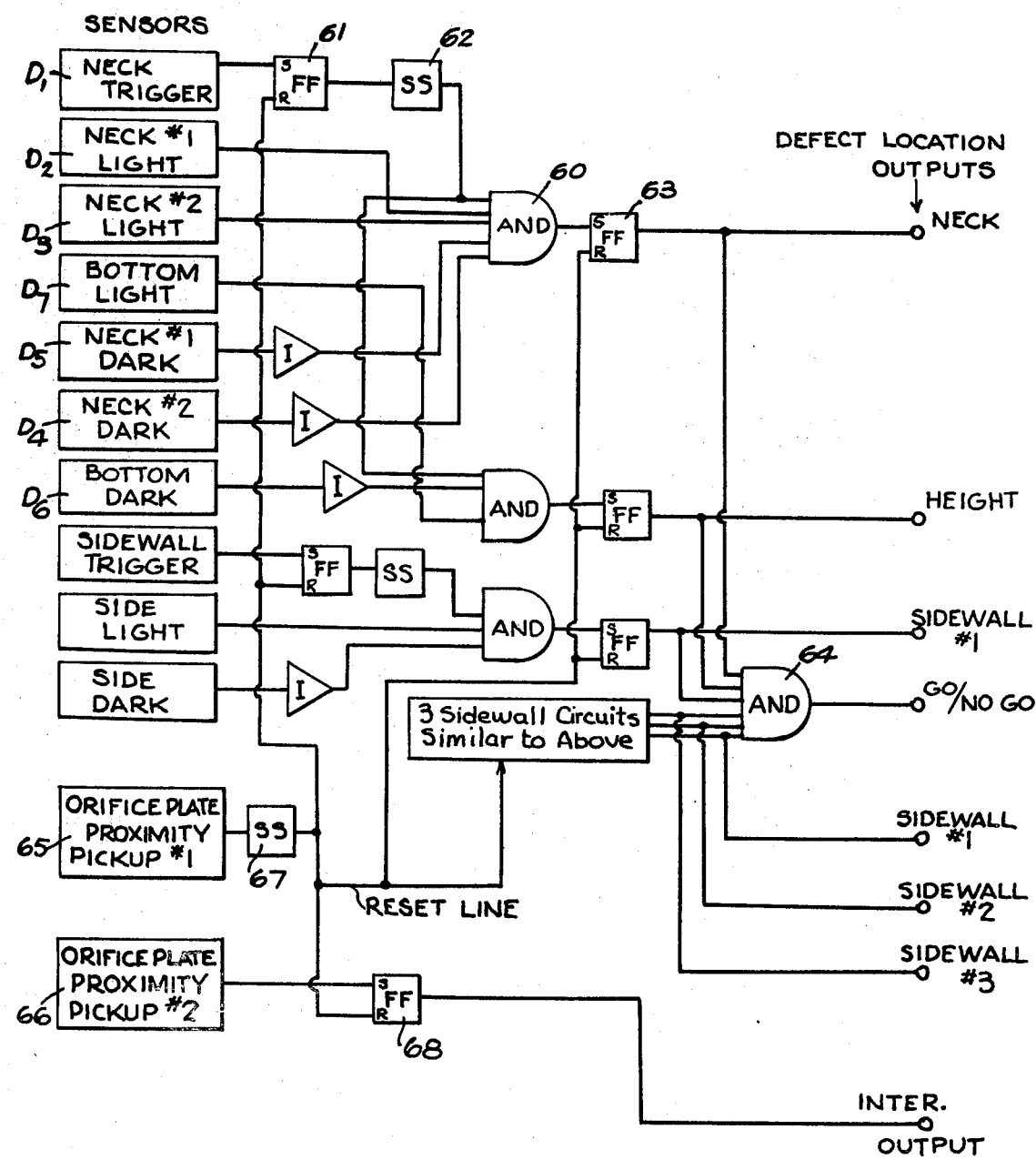
FIG. 13 is a schematic wiring diagram of the electronic circuitry utilized in the system.

FIG. 13 shows the block diagram of the logic circuitry used with this gauge. Digital signal conditioning (rather than analog) is used to eliminate factors such as light intensity fluctuations, dirt, stray light, etc. from influencing the precision of the guage.

As shown on FIG. 13, the photocell signal from detector $D_2$ corresponding to the maximum profile, designated Neck No. 1 light, together with the inverted signal from the minimum profile photocell, $D_5$ designated Neck No. 1 dark, are applied to the input of an AND gate 60. The trigger signal derived from the trigger photocell $D_1$ sets a flip-flop 61 which fires a one-shot multivibrator 62 which also inputs to the AND gate 60. Other inputs to AND gate 60 are derived from the detectors $D_4$, $D_3$ associated with portion $P_3$ of the article. If the light and dark photocells are illuminated in a manner to indicate that portions $P_2$, $P_3$ exceed predetermined limits, a reject signal will occur at the output of the AND gate which will set the next flip-flop 63. If the shape of the article is satisfactory, flip-flop 61 is not set.

If a reject is determined, a flip-flop is set for each dimensional check with the exception of the neck where one flip-flop is set for both dimensions. In this way, four sidewall dimensions, the height, and the neck dimensions are checked. These six signals are applied to the input of an AND gate 64. The output of this AND gate 64 is the accept-reject signal.

The flip-flop operated by the trigger signal is used to prevent false interrogation after the leading edge of the article has passed. This flip-flop is set once by the leading edge of the article and remains set until just prior to the passing of the leading edge of the next article. Thus, false trigger signals due to glass irregularities are prevented.

Each set of detectors or photocells (i.e. the trigger and the maximum and the minimum) independently operate their final flip-flop with the exception of the height which is operated by the neck trigger; the five measurements are independent. This simplifies the set-up of the inspecting apparatus and minimizes error due to lateral article displacement.

Proximity pick-ups 65 and 66 (FIG. 13) are used to sense the position of each orifice plate 11. The first pick-up 65 is used to reset the gauge. It is positioned to operate just before the article reaches the measurement area. The second pick-up 66 is positioned to operate just after the article leaves the measurement area. The signal from this operates a flip-flop 68 which sends an interrupt or synchronizing signal to the computer and/or to a reject register device.

The digital output, corresponding to the acceptability of the bottle, is retained in a holding circuit until the next bottle is just ready to enter the gauge area. (No. 1 pick-up, FIG. 13). In this way, the information is available for interrogation by a computer for the maximum amount of time.

In operation, the articles are moved in a continuous path through the inspection station without rotation. At the inspection station, the configuration of the article at a longitudinally spaced horizontal plane is independent of any other horizontal plane except for the inspection at the neck which is done simultaneously with the inspection for length.

We claim:

1. The method of determining cross sectional deviation of portions of the periphery of an article with other portions on the periphery of the article which comprises moving the article continuously without rotation past an inspection station, directing a first beam of radiant energy transversely of the path of the article, causing a first portion of the article to intercept said first beam of radiant energy thereby interrupting the beam, directing a second beam of radiant energy at an acute angle to the path of the article in such a manner that it is in predetermined relation to a second portion of the article when said first portion of the article intercepts the first beam, said second beam being directed such that when the second portion of the article is in predetermined relation to the first part, a part of said second beam is intercepted by said article and another portion of the second beam is not intercepted by the article, directing a third beam of radiant energy at an acute angle to the path of the article at another portion of the article in predetermined relation to the first and second beams in a manner such that when the third portion of the article is in predetermined relationship to the first portion of the article, a portion of said third beam is intercepted by the article and another portion is not intercepted by the article, directing a plurality of parallel pairs of beams at an acute angle to the continuous path of the article, said parallel pairs of beams being provided at planes longitudinally spaced with respect to said article, at least two pairs of beams being provided at circumferentially spaced area in a single plane, each said pair of beams being directed such that when one portion of the article in the plane of said pair of beams is intercepted by one of said pair of beams in predetermined relation to another portion of the article, a portion of said other beam of said pair of beams is intercepted by the other portion of the article and another portion of said other beam is not intercepted by the other portion of the article, directing an additional beam of radiant energy in the plane of the end of the article, and causing said article to be rejected in the event that said second or third beams are entirely intercepted by the article or no portion of said second and third beams is intercepted by the article or all or none of each of one of each of the other beams of each said pairs of parallel beams is intercepted by the article thereby indicating that the second or third portion of the article or the portions of the article intercepted by said parallel beams are not in predetermined relation to the article.

2. The method set forth in claim 1 including directing another beam transversely of the path of the article for partial interception by an article of predetermined length, causing said article to be rejected when said last-mentioned beam is entirely intercepted by the article or no portion of said beam is intercepted by the article when the first beam is intercepted.

3. The method set forth in claim 1 wherein said article moved in said path comprises a partially formed hot hollow glass article suspended from its open upper end.

4. The method of determining cross sectional deviation of portions of the periphery of an article with other portions on the periphery of the article which comprises moving the article continuously without rotation past an inspection station, directing a first beam of radiant energy transversely of the path of the article, causing a first portion of the article to intercept said first beam of radiant energy thereby interrupting the beam, directing a second beam of radiant energy in such a manner that it is in predetermined relation to a second portion of the article when said first portion of the article intercepts the first beam, said second beam being directed such that when the second portion of the article is in predetermined relation to the first part, a part of said second beam is intercepted by said article and another portion of the second beam is not intercepted by the article, directing a third beam of radiant energy at an acute angle to the path of the article at another portion of the article in predetermined relation to the first and second beams, and causing the article to be rejected when the third portion of the article is in predetermined relationship to the first portion of the article, a portion of said third beam is intercepted by the article and another portion is not intercepted by the article.

5. The method set forth in claim 4 including directing another beam transversely of the path of the article for partial interception by an article of predetermined length, causing said article to be rejected when said last-mentioned beam is entirely intercepted by the article or no portion of said beam is intercepted by the article when the first beam is intercepted.

6. An apparatus for determining the deviation of one portion of an article with respect to another portion of the article comprising means for moving the article continuously in a path without rotation past an inspection station, a first source of radiant energy mounted adjacent to the inspection station for directing a first beam of radiant energy transversely of the path in position to be intercepted by a first portion of the article, a first detector positioned with its line of sight intercepting the first beam of radiant energy, whereby a first signal is produced when the article intercepts the beam, a second source of radiant energy directing a second beam of radiant energy at an acute angle to the path of the article in such a manner that the second beam is in predetermined relation to a second portion of the article at the inspection station, a pair of detectors having their lines of vision such that when another portion of the article is in predetermined relation to the first portion of the article thereby de-energizing said first detector, one of said pair of detectors is energized and the other is de-energized, means for directing a third beam of radiant energy at an acute angle to the path of the article at a third portion of the article in predetermined relation to the first beam, a second pair of detectors positioned in a manner such that when the third portion of the article is in predetermined relationship to the first portion of the article, a part of said third beam energizes one of said second pair of detectors and another part of said third beam is intercepted by the article, means for directing parallel pairs of beams at an acute angle with respect to the path of the article, said parallel pairs of beams being at longitudinally spaced planes with respect to the article, at least two pairs of said beams being positioned in each said plane such that each pair is in predetermined relation with respect to two circumferentially spaced portions of the article, a single detector associated with one of each of said pairs of beams and a pair of detectors being associated with the other of said pair of beams such that when one portion of the article in the plane of said pair of beams is intercepted by one of said pair of beams in predetermined relation to another portion of the article, a portion of said other beam of said pair of beams is intercepted by the other portion of the article and another portion of said other beam is not intercepted by the other portion of the article, and means for creating a reject signal when said pair of detectors associated with said second beam is energized simultaneously or de-energized simultaneously when said first detector is de-energized or when said pair of detectors associated with said third beam is energized simultaneously or de-energized simultaneously when said first detector is de-energized or when any of said pairs of detectors associated with the other beams of said pairs of beams are energized simultaneously or de-energized simultaneously.

7. The apparatus set forth in claim 6 including means for directing another beam of radiant energy at an acute angle to the path of the article at another portion of the article in predetermined relation to the first and second beam, and means for causing the article to be rejected when the third portion of the article is in predetermined relationship to the first portion of the article, a portion of said third beam is intercepted by the article and another portion is not intercepted by the article.

8. The combination set forth in claim 6 including means for directing another beam transversely of the path of the article for partial interception by an article of predetermined length, and means for causing said article to be rejected when said last-mentioned beam is entirely intercepted by the article or no portion of said beam is intercepted by the article when the first beam is intercepted.

9. An apparatus for determining the deviation of one portion of an article with respect to another portion of the article comprising means for moving the article continuously in a path without rotation past an inspection station, a first source of radiant energy mounted adjacent to the inspection station for directing a first beam of radiant energy transversely of the path in position to be intercepted by a first portion of the article, a first detector positioned with its line of sight intercepting the first beam of radiant energy, whereby a first signal is produced when the article intercepts the beam, a second source of radiant energy directing a second beam of radiant energy at an acute angle to the path of the article in such a manner that the second beam is in predetermined relation to a second portion of the article at the inspection station, a pair of detectors having their lines of vision such that when another portion of the article is in predetermined relation to the first portion of the article thereby de-energizing said first detector, one of said pair of detectors is energized and the other is de-energized, means for directing a third beam of radiant energy at a third portion of the article in predetermined relation to the first beam, a second pair of detectors positioned in a manner such that when the third portion of the article is in predetermined relationship to the first portion of the article, a pair of said third beam energizes one of said second pair of detectors and another part of said third beam is intercepted by the article, and means for creating a reject signal if both or each of said pair of detectors are energized or de-energized when said first detector is de-energized.

10. The apparatus set forth in claim 9 including means for directing another beam of radiant energy at an acute angle to the path of the article at another portion of the article in predetermined relation to the first and second beam, and means for causing the article to be rejected when the third portion of the article is in predetermined relationship to the first portion of the article, a portion of said third beam is intercepted by the article and another portion is not intercepted by the article.

11. The combination set forth in claim 9 including means for directing another beam transversely of the path of the article for partial interception by an article of predetermined length, and means for causing said article to be rejected when said last-mentioned beam is entirely intercepted by the article or no portion of said beam is intercepted by the article when the first beam is intercepted.

* * * * *